United States Patent Office 3,322,625
Patented May 30, 1967

3,322,625
COMPOSITIONS AND METHODS FOR RELIEVING BRONCHIAL CONGESTION
Roy E. Shimmin, 30 Derwent Drive, Maidenhead, England
No Drawing. Filed Nov. 15, 1965, Ser. No. 507,701
Claims priority, application Great Britain, Nov. 19, 1964, 47,105/64
6 Claims. (Cl. 167—54)

This invention relates to pharmaceutical compositions for use in the treatment of respiratory diseases in which there is congestion of the respiratory passages with mucous; in particular it refers to such compositions in aerosol form.

In general mucous is of two kinds. One of these is viscid or mucoid mucous which consists largely of mucopolysaccharide and mucoprotein; this is highly viscous and is not infected. The other kind of mucous, purulent mucous, is usually infected and contains in addition fibrous nucleoproteins but is usually less vicous.

The patient suffering from such complaints is often unable to clear the congestion because of its viscosity. It is therefore desirable to reduce the viscosity of the mucous so that ciliary action is restored and he or she can remove it. Dilation of the respiratory passage is also helpful and has been held by some Medical Practitioners to be essential to successful treatment. Proposals have been made to reduce the viscosity by direct physical or chemical action. Thus the use of an aerosol spray containing a redox system, for instance ascorbic acid, sodium percarbonate and copper sulphate ("Ascoxal"), a detergent or a proteolytic enzyme such as trypsin of chymotrypsin or even merely steam has been proposed.

The purpose of this invention is to provide a composition suitable for use in the aforementioned conditions having enhanced mucolytic properties such that the viscosity of mucous is rapidly reduced together with bronchodilator properties so that the patient is enabled to remove it.

The invention provides a pharmaceutical composition suitable for use in the treatment of respiratory diseases in which there is congestion of the respiratory passages with mucous, having enhanced mucolytic properties together with bronchodilator properties comprising (a) the salt with a pharmaceutically acceptable acid of a cysteine ester, preferably the salt of a lower alkyl cysteine ester such as the methyl or ethyl ester, and (b) a bronchodilator drug for instance a sympathomimetic amine such as adrenaline (epinephrine), isoprenaline (isoproterenol), phenylephrine and ephedrine in the form, if desired, of a salt with a pharmaceutically acceptable acid.

It has been found that cysteine ester salts not only have a powerful mucolytic action on viscid or mucoid mucous but also on the more difficultly mucolysed purulent mucous. It has been thought in the art that in general a proteolytic enzyme would be needed in order efficiently to hydrolyse a purulent mucous. N-acetyl-L-cysteine has been reported to possess mucolytic activity against both purulent and mucoid mucous but as is shown hereafter its mucolytic action is slow and substantially lower.

The cysteine ester can be used in the form of a salt with a strong acid such as the hydrochloride. The use of organic salts such as the maleates, hydrogen maleates, tartrates, hydrogen tartrates and their sodium or potassium salts, succinates, ascorbates and the like are also convenient; in vitro tests however indicate that such salts are not so powerful in their mucolytic action as the salts with strong acids.

It is preferred to use ester salts (particularly the methyl and ethyl ester salts) of L-cysteine as these have, in addition to their mucolytic properties, useful cicatrising and bronchial secretion suppression properties.

The compositions of the invention are most conveniently applied in aerosol form since then they can be inhaled by a patient from an inexpensive pocket aerosol pack, thus avoiding hospital treatment with bulky aerosol production equipment. The composition can in this way easily reach the site of congestion.

Thus an aerosol composition in accordance with the invention can have the principal active constituents, that is the cysteine ester salt and the bronchodilator as a finely divided powder, for instance in a particle size of less than 50 microns, in aerosol form with the powder suspended in a liquid aerosol propellant.

Aerosol propellants usually boil below about 60° F. and are normally low boiling chlorinated and/or fluorinated hydrocarbons, for instance, trichloromonofluoromethane, dichlorotetrafluoroethane and trichlorotrifluoromethane, dichloroterafluoroethane and trichlorotrifluoroethane.

Such a composition conveniently has the powdered constituents suspended by means of a surface active agent and this is preferably relatively lipophilic so that good suspension of the relatively polar drug particles in a relatively nonpolar liquid is achieved. When a relatively lipophilic surface active agent is used, the composition is preferably substantially anhydrous, for instance with a water content below 0.05%, in order to ensure stability of the suspension on storage.

The surface active agent conveniently has a hydrophile-lipophile balance ratio of less than 10 and is conveniently a nonionic surface active agent, for instance an ester or partial ester of a fatty acid containing from 6 to 22 carbon atoms with an aliphatic polyhydric alcohol or its cyclic anhydride such as for example ethylene glycol, glycerol, erythritol, mannitol, sorbitol and sorbitol anhydrides (sorbitans) e.g. those sold under the trade marks "Tween" or "Span," particularly sorbitan mono or trioleates "Span" 80 and "Span" 85). It is not however, essential to use a surface active agent.

The powder particles are, in the case of the cysteine ester salt, preferably in a larger size range, e.g. 5 or 10–25 or 35 microns so that they will be deposited in the larger bronchial passages where much of the immovable, tenacious mucous collects and is difficult to expectorate. The bronchodilator particles are conveniently in a small size range, e.g. 1–5 microns so that they will be deposited in the smaller bronchial passages where a larger surface area is avialable for bronchodilator activity, without the particles being largely re-expired. It is however, practicable to have particles of both constituents in the same size range of, for instance, 1 to 5 or 10 microns or 5 or 10 to 25 or 35 microns.

The surface active constitutents can also be dissolved in an aerosol propellant as aforementioned which contains a solubilising cosolvent, for instance ethanol or propylene glycol which may contain a little water if desired.

In general the compositions can contain between 0.01% and 15% of the cysteine ester salt, between 0.01% and 2% of bronchodilator, at least 15% (and up to 95% where a cosolvent is present or larger proportions in the case of a suspended powder preparation) of an aerosol propellant and up to 75% of other constituents.

The dosage per metered dose, when an aerosol dispenser of the kind delivering a metered dose is used, is preferably in the range 1–10 mg., preferably 2–5 mg. of the cysteine ester salt and 0.005–1.0 mg. of the bronchodilator drug, for instance 0.1 mg. of isoprenaline sulphate.

In addition to the principal components of the compositions of the invention, there may be present other medicaments, for instance hormones, enzymes, alkaloids, steroids, analgesics, antihistamines, antibiotics and sulphonamides and synergistic combinations of them.

The following in vitro tests were carried out on pooled sputum, made available by a London hospital. By visible examination, the sputum samples were graded according to the following scheme:

Mucoid 1—No infection present.
Purulent 1—Pus centres occupy less than ⅓ of the total mass.
Purulent 2—Pus centres occupy from ⅓ to ⅔ of the total mass.
Purulent 3—Pus centres occupy more than ⅔ of the total mass.

Each sample of pooled sputum was blended using an air-stirrer blade which cut any aggregates without homogenisation.

The sample was divided into seven parts and each part weighed into a bacterial roll tube. The seven tubes were rotated slowly on a roll tube machine for 30 minutes at 37°. The six chemicals under test were added to six tubes of sputum at the rate of 50 mgm./10 g. sputum. One tube of untreated sputum was used as a control. All the seven tubes were rotated at 37° for a further 30 minutes.

The samples were allowed to cool to room temperature and their viscosity was measured using a Consistometer (Blackburn et al., B. Vet. J., 218, 321, 1962) suitably modified. Viscosity measurements were usually made soon after room temperature had been attained. In certain cases the samples were allowed to stand for prolonged lengths of time at room temperature and the measurements repeated to determine if further alterations in viscosity had been made.

Essentially the modified Consistometer enables a measurement to be made of the time taken for sputum to rise up a fixed length of a standard 0.5 mm. diameter capillary tube, under the influence of a vacuum of either 5 or 10 inches of Hg. The time taken was measured for each sample and related to the time taken for water to pass up the tube under the same test conditions. In this way an estimate of the viscosity of the sputum samples relative to that of water could be made. The average of three or more readings of the time taken for sputum samples to rise up six inches of 0.5 mm. diameter capillary tubing under the influence of a standard vacuum was calculated and divided by the time taken for water to pass up the tube under the same test conditions.

The relative viscosity figures were placed in grades ensuring that significant conclusions were drawn from the results.

The grades are as follows:

TABLE I

| Grade | Degree of Viscosity by Reduction | Relative Viscosity Value |
|---|---|---|
| A | Excellent Reduction | 0–45 |
| B | Good Reduction | 45–125 |
| C | Medium Reduction | 125–240 |
| D | Slight Reduction | 240–1,000 |
| E | No Significant Reduction | 1,000 |

Reduction to Grades A and B viscosities were considered as being a successful mucolysis of the sputum under test.

TABLE II

| Test No. | Vac. "Hg | Sputum [1] Viscosity Reduction Grading | | | | | | |
|---|---|---|---|---|---|---|---|---|
| | | MCH | MCT | ECH | ECT | NaCl | NAC | Control |
| Mucoid 1 Sputum: | | | | | | | | |
| 1 | 5 | A | B | A | A | E | E | E |
| 2 | 5 | A | B | A | A | E | D | E |
| Purulent 1 Sputum: | | | | | | | | |
| 3 | 5 | B |  | B | C | E | E | E |
| 4 | 10 | A | B | A | B | D | D | D |
| 5 | 10 | A | A | A | A | E | D | E |
| Purulent 2 Sputum: | | | | | | | | |
| 6 | 5 | A | A | A | A | E | B | E |
| 7 | 5 | A | C | B | C | E | E | E |
| 8 | 10 | A | B | A | B | E | D | E |
| 9 | 10 | B | B | B | B | E | D | E |
| 10 [2] | 10 | A | A | A | A | E | D | E |
| 11 | 10 | A | B | A | B | E | E | E |
| 12 | 5 | B | A | A | B | E | E | E |
| 13 | 10 | B | A | A | B | E | E | E |
| Purulent 3 Sputum: | | | | | | | | |
| 14 | 5 |  |  | A |  |  |  |  |
| 15 | 10 |  |  | A |  |  |  |  |

[1] Sufficient sputum was available for one test only.
[2] Viscosity measurements made after 2 hours standing.
Control—Untreated sputum.
MCH, ECH—methyl and ethyl cysteine hydrochlorides respectively.
MCT, ECT—Corresponding tartrates.
NaCl—Sodium chloride.
NAC—N-acetyl cysteine.

It is concluded that ethyl and methyl cysteine hydrochlorides are more effective than the corresponding tartrates as mycolytic agents against all types of sputum and that both are much more effective than sodium chloride or N-acetyl-L-cysteine (whose use has been proposed as a mucolytic agent). It is to be particularly noted that the cysteine ester salts are effective mucolytic agents against both mucoid and purulent sputum.

Further tests were carried out to show the relationship between sputum viscosity and time of contact with the mucolytic agent.

Sputum samples were stored at room temperature for fixed lengths of time after viscosity measurements had been made and the viscosity was again measured to ascertain what alteration here had been in the viscosity. The results are given in Table III.

TABLE III

| Test No. | Vac. "Hg | MCH | MCT | ECH | ECT | NaCl | Control | NAC | Time of Contact with Sputum, hrs. |
|---|---|---|---|---|---|---|---|---|---|
| Mucoid 1 Sputum: | | | | | | | | | |
| 1 | 5 | A | B | A | A | E | E | E | 0 |
|  |  | A | A | A | A | E | E | A | 52 |
| Purulent 1 Sputum: | | | | | | | | | |
| 2 | 10 | A | B | A | B | D | D | D | 0 |
|  |  | A | A | A | A | E | E | D | 1¾ |
|  |  | A | A | A | A | D | E | D | 4 |
| Purulent 2 Sputum: | | | | | | | | | |
| 3 | 10 | B | B | B | B | E | E | D | 0 |
|  |  | A | A | A | A | E | E | A | 18 |
| 4 | 10 | A | A | A | A | E | E | D | 2 |
|  |  | A | A | A | A | E | E | C | 4 |
| 5 | 10 | B | A | A | B | E | E | E | 0 |
|  |  | A | A | A | A | E | E | D | 4¾ |

It is further concluded that the alkyl cysteine esters have a rapid mucolytic action suitable for quick relief of congestion in patients. The action of the already proposed N-acetyl-L-cysteine is slow.

Toxicity tests were made on the lung irritancy of guinea pigs exposed to aqueous 1% solutions of cysteine ester salts in aerosol form delivered from a Wright nebuliser for periods of up to 15 minutes. Methyl and ethyl cysteine hydrochlorides and tartrates tested in this way did not produce any significant dispnoea and there was no evidence of eye irritancy. With ethyl cysteine tartrate some gasping movements were observed after 12 minutes. The pH of the solutions ranged between 4.5 and 5.4.

The following examples illustrate compositions found to be effective in relieving respiratory congestion due to mucous accumulations when administered by means of aerosol dispensers. In Numbers 1 and 2 the active materials (cysteine ester hydrochlorides and isoprenaline hydrochloride) are in solution. Numbers 3, 4, and 5 illustrate stabilized suspensions of the active ingredients, which are in micropulverized form.

Example 1

| | Percent w/w |
|---|---|
| Methyl Cysteine hydrochloride | 2.0 |
| Isoprenaline hydrochloride | 0.2 |
| Ethanol (abs.) | 51.0 |
| Water | 2.0 |
| Propellant 114 | 20.2 |
| Propellant 12 | 24.6 |

Example 2

| | Percent w/w |
|---|---|
| Ethyl Cysteine hydrochloride | 4.0 |
| Isoprenaline hydrochloride | 0.2 |
| Ethanol (abs.) | 48.8 |
| Water | 2.0 |
| Propellant 114 | 20.2 |
| Propellant 12 | 24.8 |

Example 3

| | Percent w/w |
|---|---|
| Ethyl cysteine hydrochloride | 1.0 |
| Isoprenaline sulphate | 0.1 |
| "Span" 85 | 1.0 |
| Propellant 11 | 20 |
| Mixture of propellants 12 and 114, 20%/80% | 77.9 |

Example 4

| | Percent w/w |
|---|---|
| Methyl cysteine hydrochloride | 0.5 |
| Isoprenaline hydrochloride | 0.1 |
| "Span" 85 | 0.5 |
| Propellant 11 | 20.0 |
| Mixture of propellants 12 and 114, 20%/80% | 78.9 |

Example 5

| | Percent w/w |
|---|---|
| Methyl cysteine tartrate | 0.5 |
| Epherdrine hydrochloride | 0.1 |
| "Span" 85 | 0.5 |
| Propellant 11 | 20.0 |
| Mixture of propellants 12 and 114, 20%/80% | 78.9 |

Propellant 11=Trichloromonofluoromethane.
Propellant 12=Dichlorodifluoromethane.
Propellant 114=Dichlorotetrafluoroethane.
"Span" 85=Sorbitan trioleate (Atlas Chemical Industries, Inc.).

It is known that solutions in alcohols, etc., of bronchodilator drugs of the adrenalin type tend to discolor on standing, probably due to autoxidation. The compositions of the present invention have the considerable advantage that they do not undergo this discoloration, probably because the cysteine derivative contained therein is capable of functioning as an antioxidant.

I claim:

1. An aerosol composition comprising a dispersion of a bronchodilator drug and an acid addition salt of a lower alkyl ester of cysteine in a liquid medium comprising a nontoxic volatile halogenated lower alkane propellant.

2. A composition according to claim 1 in which the salt of the lower alkyl ester of cysteine is a salt of the methyl ester of cysteine.

3. A composition according to claim 1 in which the salt of the lower alkyl ester of cysteine is a salt of the ethyl ester of cysteine.

4. A composition according to claim 1 in which the bronchodilator drug and the cysteine ester salt are dissolved in a liquid medium comprising a mixture of a nontoxic oxygenated solvent selected from the group consisting of ethanol and propylene glycol and at least one non-toxic halogenated lower alkane propellant.

5. A composition according to claim 1 in which the bronchodilator drug and the salt of the lower alkyl ester of cysteine are present as a stabilized suspension of finely divided solid in a liquid medium comprising at least one nontoxic halogenated lower alkane propellant.

6. A method of relieving bronchial congestion which comprises contacting the affected bronchia of a patient with an effective amount of an aerosolized dispersion of a bronchodilator drug and a non-toxic acid addition salt of a lower alkyl ester of cysteine.

No references cited.

ALBERT T. MEYERS, *Primary Examiner.*

STANLEY J. FRIEDMAN, *Assistant Examiner.*

UNITED STATES PATENT OFFICE
CERTIFICATE OF CORRECTION

Patent No. 3,322,625                          May 30, 1967

Roy E. Shimmin

It is hereby certified that error appears in the above numbered patent requiring correction and that the said Letters Patent should read as corrected below.

In the heading to the printed specification, lines 4 and 5, for "Roy E. Shimmin, 30 Derwent Drive, Maidenhead, England" read -- Roy E. Shimmin, Maidenhead, England, assignor to American Home Products Corporation, New York, N. Y., a corporation of Delaware --.

Signed and sealed this 3rd day of December 1968.

(SEAL)
Attest:

Edward M. Fletcher, Jr.

Attesting Officer

EDWARD J. BRENNER

Commissioner of Patents